April 14, 1931.  W. CONNORS  1,801,141

RACING APPARATUS

Filed Aug. 29, 1930

Inventor
William Connors,
By Townshend & Townshend
Attorneys

Patented Apr. 14, 1931

1,801,141

UNITED STATES PATENT OFFICE

WILLIAM CONNORS, OF GULFPORT, MISSISSIPPI

RACING APPARATUS

Application filed August 29, 1930. Serial No. 478,720.

This invention relates to apparatus for exercising and racing dogs and is a continuation in part of the invention disclosed in my prior United States Patent, No. 1,770,068 of July 8, 1930.

The invention has particular reference to track mounted apparatus arranged for electrical propulsion along a trackway for moving a lure which is generally arranged in the form of a dummy rabbit. Devices of this general nature are well known by those skilled in the art.

The objects of the invention are: the provision of an apparatus of this general nature having novel structural details of assembly and operation and in which a movable carrier is disposed in a vertical position on a trackway, and in which the elements of the apparatus are so disposed as to provide for a constant and positive engagement of the electrical contact elements throughout the entire operation of the apparatus; to provide an apparatus of this general nature in which the operative elements thereof are arranged to maintain a substantially constant balance on the parts thereof; and generally to provide an improved simple structure or assembly of the mechanical rabbit type having a novel mounting and propelling means.

With these objects in view and such others as will be apparent from the description, the invention resides in the novel construction, combination and arrangement of parts hereafter described and claimed and illustrated in the accompanying drawings wherein:

Figure 1:
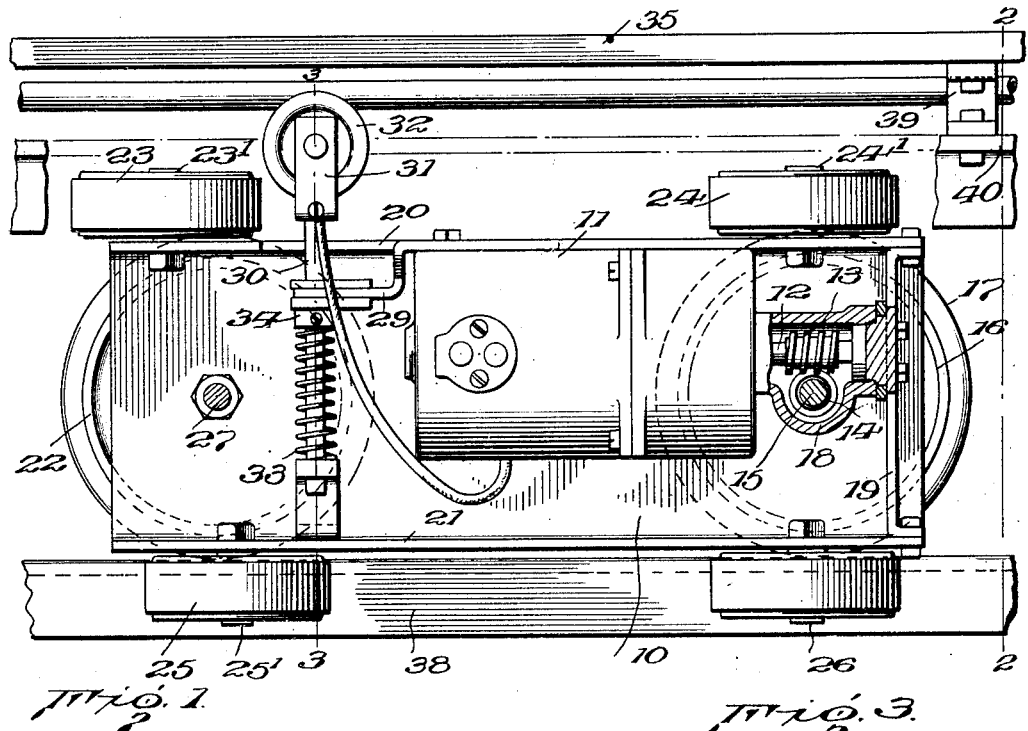
Figure 1 is a side elevation of an apparatus constructed in accordance with the principles of the invention and as operatively mounted on a trackway.

In detail the structural elements of the apparatus comprise a channel base plate 10 which has rigidly secured thereto in the trough portion thereof an electric motor 11, the shaft 12 of which extends forwardly relative to the apparatus and is provided with a worm gear 13 in constant mesh with a driven gear 14 which is rigidly secured to the shaft 15 of a drive wheel 16 carrying on its periphery a tire 17 to provide an efficient operative engagement with an element of the trackway to be later described in detail.

The gearing connection just described is enclosed within a housing 18 supported on an end bracket 19 which is rigidly secured by the upper and lower flanges 20 and 21 of the channel plate 10. The shaft 15 of the drive wheel 16 is journaled through the plate 10 with wheel 16 disposed in parallel relation to the plate and on the side thereof opposite from the trough in which the motor 11 is located. The driving wheel is located at the forward end of the apparatus and in order to provide a balance a similar wheel 22 is mounted at the rear end of the apparatus, this rear wheel 22 serving only as a bearing wheel and having no operative driving connection whatsoever with the motor 11.

Adjacent the four corners of the channel plate 10 are disposed four guide wheels 23, 24, 25, and 26 respectively, which wheels are of metal construction and which are mounted on stub axles formed of the stems of bolts 23', 24', 25', and 26'. These bolts are threaded through the flanges 20 and 21 of plate 10, being anchored in position by suitable means shown in the present instance as lock nuts. This construction disposes the four guide wheels in parallel relation to the plate flanges 20 and 21, the peripheries of the guide wheels, however, extend slightly beyond the edges of the flanges in order to provide for a bearing against trackway elements to be described.

An arm 27 is rigidly attached at its inner end to the trough of the channel plate 10 adjacent the rear end of the device, with the arm projecting laterally from the base plate and providing a means upon which the lure, not shown, is mounted.

Attached to the lower flange 21 and extending laterally into the trough of the plate 10 is a bracket 28 which cooperates with a similarly mounted bracket 29 carried by the upper flange 20 to provide a guide for the shank 30 of a trolley, the fork 31 of which carries a trolley wheel 32 which is normally projected upwardly relative to the device by the means of a coil expansion spring 33 acting between the lower bracket 28 and collar 34 rigidly secured to the shank 30 of the trolley as clearly described in Figure 1. The shank 30 of the trolley passes freely through and is guided by the respective brackets 28 and 29 and the upper flange 20 of the carrier plate, this construction eliminating any possibility of side sway and insuring a constant engagement of the trolley wheel with the trackway contact element with which it is adapted to be engaged.

Figure 2:
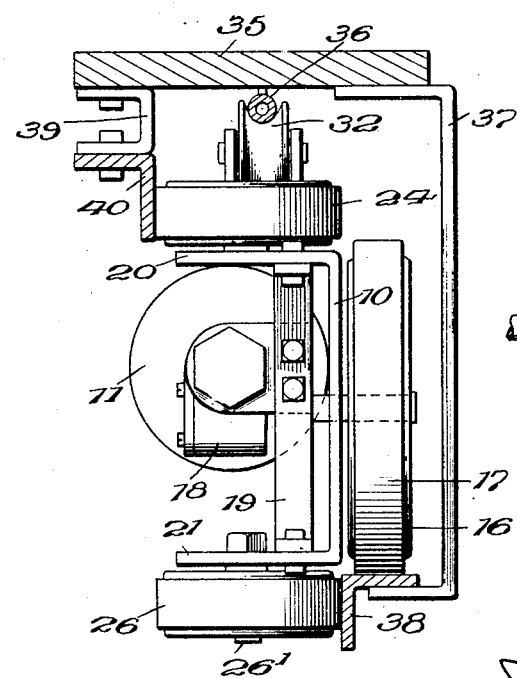
Figure 2 is a vertical section on the line 2—2 of Figure 1.
Figure 3:
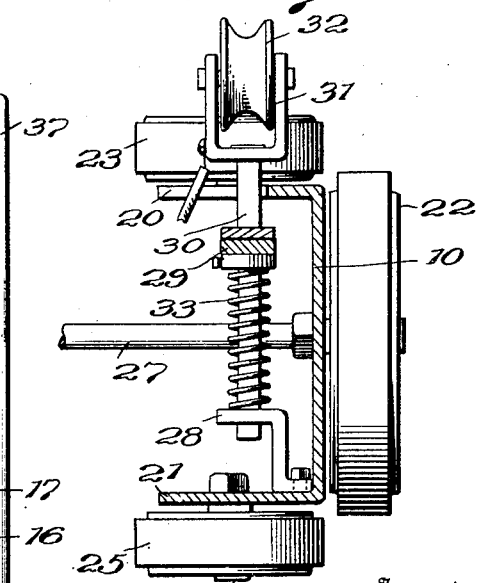
Figure 3 is a vertical section on the line 3—3 of Figure 2.

A suitable form of trackway and mounting therefor, consists of a top board 35 which has suspended therefrom along its center, a continuous metal pipe or tubing 36 which functions as a trolley wire forming the contact element which engages in the groove of trolley wheel 32 to establish an electrical connection with the motor 11. At one side of the member 35 vertical brackets support on their lower ends an angle iron rail 38 which forms the lower and bearing rail of the trackway system. The drive wheel 16 and bearing wheel 22 of the carrier are mounted to ride upon one flange of the angle iron rail 38 and the lower guide wheels 25 and 26 bear against the other flange of the angle iron rail as clearly shown in Figure 2. At the opposite side of the top plate 35 bracket means 39 is provided for supporting in rigid depending relation an upper angle iron track element 40 with one flange thereof disposed in parallel relation to the depending flange of the lower track element 38. The lateral spacing transversely of the trackway between these track elements 38 and 40 is just sufficient to accommodate the width of the carrier, resulting in a positive bearing engagement of the upper guide wheels 23 and 24 against the flange of the upper angle iron track member 40.

By this arrangement it will be apparent that the rails 38 and 40 cooperate with the guide wheels 23 and 24, 25 and 26 to prevent any possibility of derailment of the carrier during operation. At the same time the weight of the apparatus is supported through the drive wheel 16 and the rail bearing wheel 22. An important feature of the invention resides in the fact that with the wheels 16 and 22 disposed at one side of the carrier, the weight of the carrier is unbalanced transversely of the apparatus with the result that the tendency to inclination thus imparted to the carrier acts to maintain the upper and lower guide wheels in positive contact with the rail elements 38 and 40 at all times. In practice, the motor is grounded through the guide wheels in their contact with the angle iron trackway rails. If desired, the trolley means may be dispensed with and proper connections made to utilize the upper and lower track rails and drive wheels as opposite sides of the electrical circuit through the motor. This arrangement would not in any way change the structural arrangement, hereinbefore described, except in eliminating the specific trolley construction.

While in this embodiment I have illustrated and described details relative to the construction and arrangement of parts, I desire it to be understood that the same do not constitute limitations, but that any desired changes and modifications may be made in such details as would fall within the scope of the invention as claimed.

I claim:

1. A racing apparatus comprising the combination with a trackway having upper and lower rails, of a channelled plate disposed between said rails and in wheeled guiding engagement therewith, a carrier arm secured to said plate and projecting laterally therefrom, a drive wheel journalled on said plate and in engagement with one of said track rails, an electric motor mounted in the trough of said plate and operatively connected for supplying power to said drive wheel for propelling said plate along the trackway, means for supplying current to said motor, and said drive wheel being offset relative to said guide wheels whereby the weight of said plate, motor, and guide wheels serves to maintain the guide wheels in positive engagement with the track rails.

2. In a racing apparatus, a carrier comprising a channelled plate, a motor carried by said plate in the trough portion thereof, a drive wheel journalled through said plate and disposed in parallel relation therewith on the side opposite the motor, operative connection between said motor and the drive wheel, and guide wheels journalled through the flanges of said channelled plate and disposed in parallel relation to said flanges.

In testimony whereof, I affix my signature.

WILLIAM CONNORS.